| United States Patent [19] | [11] | 4,100,074 |
|---|---|---|
| Abe et al. | [45] | Jul. 11, 1978 |

[54] ANTIMONY TRIOXIDE COMPOSITION AND PROCESS OF PRODUCING THE SAME

[75] Inventors: Nobuyoshi Abe, Urawa; Shigenaga Kubo, Tokyo; Kiyoshi Kanamaru, Toda, all of Japan

[73] Assignees: Nippon Chemical Industrial Co., Ltd.; Toho Ganryo Kogyo Co., Ltd., both of Tokyo, Japan

[21] Appl. No.: 711,895

[22] Filed: Aug. 5, 1976

[30] Foreign Application Priority Data

Aug. 7, 1975 [JP] Japan .................................. 50-95416

[51] Int. Cl.² .............................................. C09K 3/28
[52] U.S. Cl. ................................ 252/8.1; 106/15 FP; 428/921
[58] Field of Search ..................... 252/8.1; 106/15 FP; 117/136; 428/921

[56] References Cited

U.S. PATENT DOCUMENTS 3,940,516  2/1976  Gierek et al. ..................... 252/8.1 X
3,962,164  6/1976  Praetz et al. ...................... 252/8.1 X

*Primary Examiner*—Stephen J. Lechert, Jr.
*Attorney, Agent, or Firm*—Sughrue, Rothwell, Mion, Zinn and Macpeak

[57] ABSTRACT

An antimony trioxide composition useful as an excellent flame retarding additive comprises antimony trioxide particles coated with hydrous zirconium oxide and amorphous silica.

The antimony trioxide composition is prepared by adding an aqueous solution of a zirconium salt to an aqueous slurry of antimony trioxide particles to form zirconium hydroxide therein and to deposit the hydroxide on the surfaces of the antimony trioxide particles, recovering the particles and dehydrating them to form a coating of zirconium hydroxide on the particles, dispersing the hydrous zirconium oxide-coated particles in water, and then adding to the resulting aqueous dispersion a silica sol to deposit amorphous silica on the surfaces of the hydrous zirconium oxide coated antimony trioxide particles.

24 Claims, No Drawings

ANTIMONY TRIOXIDE COMPOSITION AND PROCESS OF PRODUCING THE SAME

BACKGROUND OF THE INVENTION

1. Field of the Invention

The present invention relates to an antimony trioxide composition coated with hydrous zirconium oxide-silica and to a process of producing the composition.

2. Description of the Prior Art

At present, plastics are used in a number of diverse fields such as building materials, electric parts, automobiles, ships, airplanes, etc., due to their excellent physical and chemical properties, and the demand therefor is constantly increasing. On the other hand, from the view point of preventing fires and to protect human life, it has recently been required in many fields, especially those listed above, to impart flame retardance to plastics. Thus, numerous attempts to render combustible materials flame retardant or further incombustible have been made, and various flame retardants and the assistants therefor have been developed. Typical examples of such flame retardant and assistants are organic phosphorus compounds and antimony trioxide.

Antimony trioxide itself is inactive and shows almost no flame retarding effect by itself, but since it shows a flame retarding effect upon interaction thereof with other materials used therewith, antimony trioxide is considered a flame retardant assistant.

The various antimony chlorides formed by the following reactions of antimony trioxide under heating in the presence of halogen compounds show a flame preventing action:

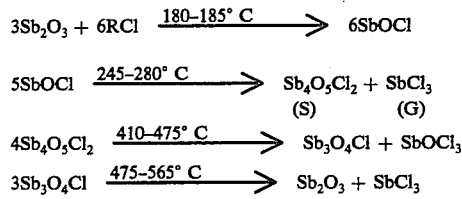

$SbCl_3$ and $SbBr_3$ are volatile and reactive. The antimony halides promote the transfer of halogen and the formation of carbide in the solid phase and act as a free radical acceptor in the vapor state, which provides a flame prevention effect. The action and mechanism of inorganic materials such as antimony trioxide which are used as a flame retarding assistant together with halide-type flame retardants have not yet been completely identified, but one of the important actions thereof is believed to be that it has the effect of diluting plastic organic materials, and further it has no influence on the flame retardant in the normal state, but, when the flame retardant is heated together with a polymer at the outset of combustion, it acts to properly reduce the decomposition point of the flame retardant to accelerate the flame retarding effect. As a matter of course, it covers the surface of the polymer at combustion to provide a covering effect.

Since antimony trioxide exhibits an excellent effect as a flame retarding assistant, it has long been used in large quantities. However, since it has the serious faults that when it is used in a plastic for molding, or for the adhesion of plastics or in rubbers, it is converted into antimony trichloride to cause yellowing or into antimony trisulfide which causes a black-brown discoloring by chlorine gas, sulfides, and other gaseous atmospheres used for vulcanization; thus, the usable range of antimony trioxide is, as a matter of fact, greatly restricted. To overcome these faults, it has generally been proposed to improve the chemical resistance of antimony trioxide by diluting the same with other inorganic materials.

The inventors attempted to coat antimony trioxide with silica to improve the chemical resistance thereof and found that such coated antimony trioxide could be used in cases which did not require high dispersion. However, in such a coating the bonding between the surface of an antimony trioxide particle and the coating was insufficient. Thus, when strong mechanical shear was applied to the antimony trioxide particles by a dispersing means to disperse the particles in a medium as a flame retardant or by hot rolls or a molding machine, the silica coating was damaged or stripped from the surface of the particles to greatly reduce the covering effect.

Considering the aforesaid problems, the inventors performed research to improve the most serious fault, i.e., the poor chemical resistance of antimony trioxide as is currently largely used in these fields, and, as a result, the inventors succeeded in remarkably improving the chemical resistance of antimony trioxide used for these purposes.

SUMMARY OF THE INVENTION

The inventors have discovered, as a result of research to improve the chemical resistance of antimony trioxide, that antimony trioxide particles coated with a zirconium compound have a high covering effect due to the strong bonding therebetween.

According to the present invention, there is provided an antimony trioxide composition comprising antimony trioxide particles, the surfaces of which have been substantially coated with hydrous zirconium oxide in an amount of less than about 10% by weight (as $ZrO_2$) based on the total weight of the composition and amorphous silica in an amount of about 1 to about 20% by weight, same basis.

Furthermore, according to another embodiment of this invention, there is provided a process of producing an antimony trioxide composition comprising a first step of adding an aqueous solution of a zirconium salt to an aqueous slurry of antimony trioxide particles so that the amount of the zirconium salt is less than about 10% by weight (as $ZrO_2$) of the total weight of the composition obtained to form zirconium hydroxide and deposit the same onto the surfaces of the antimony trioxide particles, a second step of recovering the product obtained in the first step and subjecting it to a dehydration treatment to provide antimony trioxide particles coated with zirconium hydroxide with strong bonding power, and a third step of dispersing the zirconium-coated antimony trioxide particles obtained in the second step in water and adding thereto or forming therein a silica sol so that the amount of the silica sol is about 1 to about 20% by weight (as $SiO_2$) based on the total weight of the composition obtained, to thereby deposit amorphous silica onto the surface of the zirconium-coated antimony trioxide particles.

DESCRIPTION OF THE PREFERRED EMBODIMENTS

In the present invention, the zirconium salt coating applied to the surfaces of the antimony trioxide particles is composed of zirconium hydroxide $(Zr(OH)_4)$ formed by the decomposition of a zirconium salt. Therefore, the zirconium coating in this invention is composed of a uniform deposit of zirconium hydroxide on the surfaces of the antimony trioxide particles, the zirconium hydroxide coating being very tough and the coating being present in a more strongly bonded state by further dehydrating or drying to the coating after coating the surfaces of the particles to give hydrous zirconium oxide. Moreover, to our astonishment, the coating effect of the hydrous zirconium oxide coating is very thin. For example, the amount of the hydrous zirconium oxide coating may be 0.1 to 0.5% by weight (as $ZrO_2$) based on the total weight of antimony trioxide. In any case, the amount need not over about 10% by weight (as $ZrO_2$) of the total weight of antimony trioxide, and, in many cases, preferred results are obtained when the amount is 0.1 to 5% by weight, same basis.

As mentioned above, the zirconium-based coating formed on the surfaces of antimony trioxide particles is formed of zirconium hydroxide and the covering power thereof increases with the progress of the subsequent dehydration. Since the complete dehydration of zirconium hydroxide occurs at above about 600° C., the coating formed is not in the complete zirconium oxide state. Therefore, the zirconium-based coating in this invention includes the state of zirconium hydroxide as well as the state of zirconium hydroxide where a part of the hydroxy groups have been dehydrated; thus the zirconium compound in such a coated state is referred to as hydrous zirconium oxide ($ZrO_2 \cdot nH_2O$, $0.6 \leq n < 5.5$).

In the present invention, amorphous silica is further deposited on the aforesaid hydrous zirconium oxide coating on the surfaces of the antimony trioxide particles in a substantially completely coated state in an amount of about 1 to about 20% of the total weight of the antimony trioxide composition.

Since the amorphous silica coating is formed on the aforesaid hydrous zirconium oxide coating on the surfaces of the antimony trioxide particles, the coating of this invention is, as a model, a double layer composed of a hydrous zirconium oxide coating with a silica coating formed thereon. In this case, it may happen that the hydrous zirconium oxide coating formed on the antimony trioxide particles will partially separate and disperse upon performing silica coating by redispersing the hydrous zirconium oxide coated antimony trioxide particles in water (as will be explained below), and the separated and dispersed hydrous zirconium oxide is uniformly redeposited on the antimony trioxide particles together with silica sol added to or formed in the aqueous dispersion. Thus, when the proportion of the hydrous zirconium oxide coating employed is small, the layer structure of the coating of this invention is not distinct and the term "double layer" above is conceptive. It should be noted in this regard, that while the amount of $ZrO_2 \cdot nH_2O$ is generally defined as less than about 10%, in practice, an amount of less than 1%, particularly around about 0.5%, gives a sufficient effect. In the case where the amount of $SiO_2$ is very high as compared with the amount of $ZrO_2 \cdot nH_2O$ and after coating of the $ZrO_2 \cdot nH_2O$ redeposition is carried out and mechanical shearing is then applied, it is possible that a "true" double layer structure is not formed in all circumstances. However, the invention is still effective in this case.

However, as mentioned above, the hydrous zirconium oxide coating in this invention is effective even if the proportion of the coating is small, and, further, the hydrous zirconium oxide coating of this invention is quite tough and stable due to its covering power as well as the binder-like action thereof, since it is disposed between antimony trioxide particles and silica particles.

For example, examining a silica coating and a hydrous zirconium oxide-silica coating with an electron microscope, the effect of a hydrous zirconium oxide coating can be confirmed, since in the latter case a double layer-like coating is not observed but it is clearly seen that particles of amorphous silica cover the surfaces of antimony trioxide particles as a uniform and contiguous layer, while in the former case uniformity and contiguity of the coating is frequently lacking and free amorphous silica particles are observed.

The silica coating in this invention is a uniform and contiguous coating of silica sol particles, and, since the size of the silica sol particles forming the silica coating is very fine, usually less than about 200 m$\mu$, frequently between 10 m$\mu$ and 100 m$\mu$, the surface area of the silica particles is quite large. The amount of the silica coating is about 1 to about 20% by weight of the total weight of the antimony trioxide composition.

If the amount of the silica coating is less than about 1% by weight, the antimony trioxide particles coated tend to show reduced chemical resistance. On the other hand, when the amount of the silica coating increases, the silica coating tends to gradually dilute the antimony trioxide particles with the amount of about 7% by weight as a peak, which results in reducing the oxygen index thereof (which is a measure of the flame retarding effect). Therefore, the amount of silica coating employed must be selected balancing the chemical resistance and the oxygen index of the antimony trioxide composition obtained. In general, an effective and preferred amount of the silica coating is about 1 to about 20% by weight of the total weight of the antimony trioxide composition, i.e., even if the amount of the silica coating is increased to over about 7% by weight, the reduction in the oxygen index is very slight up to about 20% by weight, and thus the wide range of about 1 to about 20%, preferably 5 to 15%, by weight can be employed in the present invention for the silica coating. The fine silica particles used in this invention are amorphous and are present on the surfaces of the substantially hydrous zirconium oxide coated antimony trioxide particles in the form of dense, amorphous silica as a substantially contiguous film. The antimony trioxide particles thus coated with the hydrous zirconium oxide silica coating have excellent resistivity to internal and external attack and thus it will be understood that the covering power of the coating is tough and stable.

The antimony trioxide composition thus coated by hydrous zirconium oxide silica coating as described above can be obtained by the following process.

First, conventional antimony trioxide is dispersed in water to provide an aqueous slurry used as a raw material. In this case, the concentration of antimony trioxide in the aqueous slurry is usually about 50 to about 200 g/liter, preferably 80 to 120 g/liter. The aqueous slurry is subjected to a zirconium treatment to form a zirconium coating on the antimony trioxide particles, and, in this case, it is preferred that the particles of antimony trioxide in the aqueous slurry be dispersed as completely as possible. For the purpose, the antimony trioxide particles are dispersed in water using a dispersing means having a strong shearing force such as a homogenizer, or using ultrasonic waves, or both a homogenizer and ultrasonic waves. Furthermore, the dispersion method as described above can also be employed in the case of the silica treatment described below.

One or more zirconium salts are added to the aqueous slurry of antimony trioxide thus prepared as an aqueous solution thereof, and, if this case, it is preferred that aqueous solution of the zirconium salt be a dilute solution, i.e., the concentration of the zirconium salt in the aqueous solution is at most about 4% by weight, preferably 0.1 to 3% by weight. If the concentration of the zirconium salt is higher than about 4% by weight, the zirconium hydroxide particles formed are nonuniformly dispersed to the antimony trioxide particles, which causes undesirable results.

Typical examples of the zirconium salts used in this invention are zirconium chloride, zirconium nitrate, zirconium sulfate, and basic salts. Other examples of the zirconium salt are zirconium acetate and water-soluble zirconates. That is, any zirconium compound which can form zirconium hydroxide in a weakly acid state or an alkaline state can be used in this invention. The amount of the zirconium salt added depends greatly upon the end use of the product, but is not over about 10% by weight (as $ZrO_2$) of the total weight of the desired antimony trioxide composition. In many cases, the use of 0.1 to 5% by weight of the zirconium salt gives a satisfactory result, but when chemical resistance, such as sulfide gas resistance, is necessary, even if pigment characteristics such as coloring power and covering power must be sacrificed (such characteristics are important in the case of using the product as a white pigment) or, on the contrary, when transparency is required, the zirconium salt may be added in an amount of more than 5% by weight and near 10% by weight without causing any problem. On the other hand, when the hydrous zirconium oxide-silica coated antimony trioxide is used as a flame retardant, it is desirable to add it in an amount of less than 5% by weight, since if the amount thereof added is greater, the flame retarding effect is reduced.

The zirconium salt added to the aqueous slurry of antimony trioxide particles under such conditions is hydrolyzed to form fine zirconium hydroxide particles in the aqueous slurry, and the fine particles of zirconium hydroxide thus formed are deposited on the surfaces of the antimony trioxide particles to uniformly coat the particles as a thin or thick film or layer thereof, according to the amount of zirconium salt added. The coating of the zirconium hydroxide particles can be regarded as an amorphous, contiguous deposit as in the silica treatment described below.

After adding the zirconium salt to the aqueous slurry of the antimony trioxide particles, the mixture is stirred for a while, for at most about 30 to about 40 minutes, to mature the system. It is preferred to thereafter neutralize the aqueous slurry to pH 6 to 7 to stabilize the aqueous slurry of zirconium hydroxide-coated antimony trioxide particles.

The exact means chosen to neutralize the aqueous slurry is not overly important, though caustic alkali materials are not preferred as they tend to damage the particles formed. Weakly alkaline materials are particularly preferred, examples of which include $NH_3$, $NH_4OH$, $(NH_4)_2CO_3$, $Na_2CO_3$ and the like. This preference is due to the following: the amount of materials such as $Na^+$, $K^+$, $SO_4^{-2}$ and the like should be as small as possible to avoid the formation of metal soaps which might cause gelation by interaction with a paint vehicle when utilizing the product of the present invention in a paint.

After thus depositing the zirconium hydroxide particles on the antimony trioxide particles in the aqueous slurry, the aqueous slurry is most preferably washed and filtered in a second step to provide a filter cake having deposited thereon zirconium hydroxide particles. The filter cake is then redispersed in water and then a silica coating treatment is carried out as described below. In the case of a filter cake, it is necessary, however, to subject the filter cake to a dehydration treatment. This is an important aspect of the second step. It should be noted, in this regard, that this second step permits the concentration of any salts present to be greatly reduced, thereby minimizing any potentially harmful effects due to materials present such as $Na^+$, etc. Quite often, it is sufficient to merely filter followed by washing or, alternatively, to filter followed by repeated decantation.

In more detail, the aforesaid aqueous slurry neutralized by the addition of the zirconium salt aqueous solution may be immediately subjected to a silica coating treatment as described below or the aforesaid filter cake may be dispersed in water and the aqueous dispersion of the filter cake subjected to a silica coating treatment; however, in the former case (immediately subjected to silica coating), the silica coating treatment is carried out in a medium containing the water-soluble salt, and, thus, there frequently occurs a tendency that the particles contain the soluble salt. Thus, for example, when the antimony trioxide particles coated with silica containing soluble salts are used as a paint material, these particles are liable to form a metal soap by reaction with the resinous material used as a vehicle, which results in a deterioration of the resinous material, an increase in viscosity of the system and a gelling of the system. That is, in the former case as well as the latter case (filter cake), the bonding force of the hydrous zirconium oxide coating formed is insufficient, and thus it is not preferred to add the zirconium salt to the aqueous dispersion of antimony trioxide particles and then directly subject the mixture to the silica coating treatment.

The aforesaid fault can be substantially removed when the water content of the filter cake is less than about 30% by weight, based on the total filter cake weight. To obtain such a filter cake, it is particularly preferred to employ a drying step. However, a positive drying step is not always necessary and the filter cake formed may be allowed to merely stand for a desired period of time or may be air-dried. In any case, it is preferred that the water content of the filter cake be kept at less than 30% by weight. When the filter cake is dried, the drying procedure is performed at temperatures below 130° C until the desired water content is obtained but, in general, it is preferred that the filter cake be dried at about 60° to about 110° C. As later indicated, it is most preferred that the water content be less than about 1% by weight. This can be expressed with relation to the "$n$" values in the formula $ZrO_2 \cdot nH_2O$ as $0.6 \leq$ and $< 5.5$.

Such a dehydration treatment provides a state where free water or bound water has been removed or, more frequently, a state where the hydroxyl group of the zirconium hydroxide has been partially dehydrated, according to the extent of the dehydration.

In this case, when the "dried" product is redispersed in water and then the dispersion is subjected to the silica coating treatment, a coating possessing higher toughness and stability is formed. Such a zirconium compound is referred to as hydrous zirconium oxide in this invention, as described above.

The third step of this invention is then performed as a coating treatment using fine, amorphous silica, and is carried out as follows. That is, the dehydrated filter cake of antimony trioxide particles which are coated with hydrous zirconium oxide treated in the second step of this invention is dispersed in water to form an aqueous slurry. In this case, the dispersion is carried out at the same slurry concentration as was employed in the first step of this invention. Moreover, if the dispersion is carried out merely by stirring, it becomes difficult to break secondary agglomerates which form and to approach a primary dispersion of particles of hydrous zirconium oxide coated antimony trioxide. Hence, in order to obtain an aqueous slurry of primary dispersion of particles, a uniform dispersion applying, for example, mechanical shear force, is required. A homogenizer is most suitably employed to achieve this effect. Other machines such as a colloid mill or an ultrasonic energy mill can also be used which provide a strong shear effect to break agglomerated particles. Operation conditions on a specific machine can be widely varied. For example, in the case of using a homogenizer, the above-described aqueous slurry can be passed therethrough with a clearance of 0.05 to 0.1 mm at 10,000 R.P.M. Such dispersions are conventionally employed in the pigment manufacturing industry, and as is clear from, for example, U.S. Pat. No. 3,639,133, one skilled in the art who operates a mill can, of course, easily select the operation conditions of the mill depending upon a kind of machine used. The aqueous slurry thus redispersed is then subjected to silica deposition treatment under the following operational conditions. In this case, it is particularly important, for performing effective silica coating treatment, to observe the following factors.

First, the antimony trioxide particles must be dispersed in the aqueous slurry thereof as sufficiently as possible and, for this purpose, it is particularly preferred to perform the dispersion by applying a mechanical shear using, for example, a homogenizer possessing a strong shearing force, to perform the dispersion using ultrasonic waves, or further to perform the dispersion employing both.

It is preferred that the pH of the aqueous slurry be maintained at about 7 to about 11, particularly 9 to 10, and for this purpose an alkali such as an alkali silicate, an alkali hydroxide, an alkali carbonate or ammonium hydroxide is used.

Furthermore, it is preferred that the temperature of the aqueous slurry be higher than about 60° C, preferably 85° to 95° C, and the system be stirred during heating.

Conditions other than the above must be avoided since in this case a siloxane bond forms to give a porous silica gel, which forms an uneven coating of silica gel on the antimony trioxide particles.

To form a silica sol in the aqueous slurry, an aqueous sodium silicate solution is added to an aqueous solution of a mineral acid such as sulfuric acid or hydrochloric acid while adjusting the pH of the system to the above range. The concentration of both aqueous solutions is as low as possible, and, in particular, the concentration thereof is preferably about 1 to about 7% by weight.

It is preferred that both aqueous solutions be added simultaneously over a period of, usually, about 1 to about 6 hours, preferably 2 to 5 hours. In order to form the desired silica sol, it is preferable that the above-described aqueous solutions be added as slowly as possible. The reason why both aqueous solutions are added simultaneously is that it is necessary to form silica sol under substantially constant pH conditions. Rapid addition and substantial pH deviation result in inadvertently forming undesirable silica gel, which must absolutely be avoided. Also, in the aqueous sodium silicate solution, the content of sodium is as low as possible, and, thus, the molar ratio of $SiO_2/Na_2O$ is preferably about 3.0 to about 3.4. The aqueous sodium silicate solution is added so that the amount as $SiO_2$ is about 1 to about 20% by weight of the total weight of the antimony trioxide composition. Under such conditions, a large amount of preferred colloidal silica particles are formed in the aqueous slurry. In particular, it is necessary to sufficiently control the pH and the temperature of the aqueous slurry.

When the silica sol is prepared in a separate step, the silica sol thus prepared is merely added to the aqueous slurry. One method is known in which a silica sol is obtained from a diluted aqueous sodium silicate solution using a hydrogen-type anionic exchange resin.

It is also possible, in accordance with the present invention, to utilize a pre-prepared silica sol, which can be separately manufactured in the processing sequence or which can be commercially obtained. The chemical and physical properties of such silica sols are well known, and are as follows:

$SiO_2$ content: 20 – 30 wt.%;
$Na_2O$ content: not more than 0.6 wt.%;
pH: 8.5 – 10 (or 3 – 4);
Particle size: 10 – 20 m$\mu$;
Specific gravity: 1.16 – 1.24 (at 20° C);
Appearance: transparent, milk-white, sticky aqueous solution.

When such a pre-prepared or purchased silica sol is used, the addition conditions, i.e., pH, temperature, pressure, etc., are the same as those in the case where the silica sol is formed in situ in the aqueous slurry, but the time for addition and the time for maturing are not overly important in this case. In general, using a pre-prepared or purchased silica sol, the addition time ranges from about 20 minutes to about 2 hours, more conveniently, from 30 to 60 minutes, and the maturing time ranges from about 20 minutes to about 2 hours, more conveniently from 30 to 60 minutes.

Also, it is possible to form silica sol from a diluted aqueous sodium silicate solution and an aqueous sulfuric acid solution by the aforesaid procedure and to dialyze the salt by-produced to substantially increase the concentration of the sol. However, such a process requires an additional step and thus is not a generally preferred method.

A silica sol is thus formed in the aqueous slurry or added thereto and after depositing the silica sol on the surfaces of the hydrous zirconium oxide coated antimony trioxide particles, the system is subjected to a neutralization treatment and then matured and then filtered, washed with water, and dried to provide the desired product. The neutralization is carried out in a weak acidic condition, i.e., at a pH of from about 6 to about 7, preferably 6.5 to 6.8. The maturing is carried out by stirring the system until the system reaches the above-specified pH range followed by allowing it to stand.

In a modification of the above process, following the deposition of the silica sol, one may further deposit a metal salt of rosin, for example, a calcium salt or a barium salt of rosin, following conventional surface treatment procedures, to further improve product characteristics.

In this regard, it is known in the plastic processing art, specifically, in the art of coating particulate materials with plastics, that breakage of coated films can be reduced under high friction forces where particulate materials are treated with a metal salt of rosin. In this case, the thus treated material can be used as a resin filler of excellent dispersibility and wettability, and the affinity of the material to resins is improved.

In the present instance, the above treatment can be carried out by slightly increasing the alkalinity of the matured silica sol to about 8 to about 9, and then adding thereto an aqueous solution of rosin soap prepared from rosin hydride and sodium hydroxide, and then adding thereto an aqueous solution of a calcium or barium salt to thereby deposit the calcium or barium salt of rosin on the above-described particles. The resulting products can be treated by conventional methods, i.e., filtration, washing, drying and grinding. These treatments are well known in the art as a rosin treatment as disclosed in, for example, U.S. Pat. No. 3,470,007. However, in the process of this invention, such a rosin treatment is not always necessary, and thus, it can be said that the process of this invention is an excellent coating treatment.

The heretofore offered disclosure will permit one skilled in the art to practice the present invention with ease. However, as with most process inventions, certain preferred conditions exist for most economical commercial scale operation, which will not be set forth. It should be understood, however, that the following is not be be construed as limitative upon the broad scope of the present invention.

Turning initially to first step (the deposition of Zr(OH)$_4$), the temperature of this step is conveniently from about room temperature to about 100° C. The temperature selected is, however, not overly important, and does not have any substantial effect upon this step of the process of the present invention. For instance, in all Examples, the treatments were carried out at room temperature, unless otherwise indicated.

It is most preferred that the time of adding the zirconium salt be extended as long as possible, i.e., that a dilute zirconium salt solution be added over as long a time as is convenient. After the zirconium salt is completely added, the system is generally stirred for a period of time. The only factor influencing the time for stirring after the completion of addition is to insure that the reaction system is uniform. Accordingly, long times are not necessary and usually times of about 40 minutes or less are used, usually less. Once a homogenous system is obtained, the system is neutralized so as to obtain a system pH of about 6 to about 7 so as to completely convert the zirconium salt to the hydroxide form, which is then deposited. Generally, about 10 minutes to about 2 hours is conveniently utilized to complete the neutralization. The overall time for the completion of the first step of the present invention will generally be conveniently about 30 minutes to about 6 hours, even more preferably from 45 minutes to 3 hours.

For practical purposes, the first step of the process of this invention is carried out substantially at atmospheric pressure. Nothing would prohibit reaction at other pressures, but no beneficially effects are obtained, and thus nothing is gained by utilizing such more complicated systems.

The second step of the process of the present invention (dehydration) can be viewed as comprising the two steps of dehydration and drying. The dehydration can be by any conventional solid-liquid separation procedure, and is not limited in any particular manner, i.e., any procedure can be employed so that the "$n$" of the $ZrO_2 \cdot nH_2O$ deposited on the $Sb_2O_3$ is reduced.

The general rule in this regard is that the smaller the value of "$n$," the greater the bonding force to the $Sb_2O_3$ particles. It is most preferred that the value of "$n$" be as close to 0.6 as possible. Conveniently, vacuum drying is often used for the dehydration. A conventional filtration can also be used. On the other hand, there are specific conditions for the subsequent drying which are commercially advisable, and these are as follows:

(i) The drying temperature is about 60° to about 130° C, even more preferably 100° to 120° C.

(ii) The drying time can be widely varied, depending upon the kind and capacity of the dryer utilized; thus, the drying time cannot be unequivocally defined. As will be appreciated by one skilled in the art, the drying time will also markedly vary with the thickness of the filter cake being dried. In general, for most commercial systems, drying is completed within about 5 hours. The time required for drying is, of course, that required to reduce the water content of the filter cake to less than about 30% by weight, even more preferably less than about 1% by weight, based on the total filter cake weight.

The pressure of the drying is not overly important. For example, the step can be carried out at sub- or super-atmospheric pressure, but is usually carried out at atmospheric pressure since no commensurate benefits are obtained by utilizing sub- or super-atmospheric pressure systems.

With respect to the third step of the process of the present invention (the deposition of essentially $SiO_2$), the concentration of the slurry which is formed upon redispersion is the same as concentration of the slurry treated in the first step of the process of this invention. Usually such will comprise from about 50 to about 200 g/liter, even more preferably from 80 to 120 g/liter, of the hydrous zirconium oxide coated antimony trioxide. The temperature is in accordance with that earlier set forth, i.e., about 60° to 100° C, in general, more preferably from 85° to 95° C. To deposit uniform, fine particles of $SiO_2$, it is most preferred that the addition be carried out as slowly as possible. Accordingly, generally about 1 to 6 hours, even more conveniently from 2 to 5 hours, are utilized to complete the formation of the silica sol on an industrial scale.

After the completion of the silica sol formaiton the system is conveniently further stirred for up to 2 hours, more generally from about 20 to 60 minutes. The pH of the reaction system during this step is maintained, as earlier disclosed, at from about 7 to about 11, more conveniently from 9 to 10. As with the first processing step, pressure is not overly important, and all remarks applied with respect to the first processing step apply with equal force to this process step. The reaction system is stirred this additional appropriate period of time to effect maturing or ageing. The stirring time required for maturing varies depending upon the addition time, and the longer the addition time, the shorter the time for maturing.

The invention will now be further illustrated in more detail by referring to the following examples of currently preferred embodiments of the invention.

EXAMPLE 1

In 1,000 parts by weight of water was dispersed 100 parts by weight of powdered antimony trioxide and the mixture stirred at room temperature until a uniform dispersion having a mean particle size of about 0.7 $\mu$ was formed. The aqueous slurry thus prepared was passed through a homogenizer (Model L-type of KOKUSAN SEIKO Company) under the following conditions: rotary velocity: 10,000 R.P.M.; clearance: 0.05 mm; flow velocity of the suspension: 5 liter/min., followed by destroying clusters or agglomerates in the aqueous slurry and dispersing the original particles as much as possible. Then, 330 parts by weight of an aqueous zirconyl sulfate ($ZrOSO_4.7H_2O$, $n=4$ to 8) solution at a concentration of 0.3% by weight (as $ZrO_2$) was added to the dispersion at room temperature over a 2 hour period. After adjusting the pH of the aqueous slurry to 6.0 by further adding thereto 20 parts by weight of a 3.0% by weight aqueous sodium hydroxide solution, zirconium coating treatment was carried out at the following conditions: pH 6.0; temperature: room temperature; pressure: atmospheric pressure; time: about 40 minutes. The particles were then separated from the aqueous slurry by decantation, washed with water, and then filtered to provide a filter cake having a water content of 55.6% by weight (hereafter, all filter cakes obtained had a water content of about 50 to about 60% by weight, determined in accordance with JIS K5101-21). Then, by drying the filter cake thus obtained by means of a hot blast drying machine maintained at 85° to 90° C. for 12 hours, about 100 parts by weight of a white antimony trioxide composition coated with hydrous zirconium oxide was obtained.

The dried product obtained was crushed into a mean particle size of about 0.8 $\mu$, and 50 parts by weight of the crushed product was redispered in 500 parts by weight of water followed by stirring uniformly at room temperature. To the aqueous slurry thus obtained was added 6 parts by weight of an aqueous sodium silicate solution ($SiO_2/Na_2O$: 3.20–3.30, as $SiO_2$: 29.0–31.0% concentration) to adjust the pH of the dispersion to 9.5–10.0. The aqueous slurry thus prepared was treated by means of a homogenizer to disperse the particles as uniformly and sufficiently as possible. Thereafter, the aqueous dispersion was maintained at 85° to 95° C., and an aqueous sodium hydroxide solution was added to the slurry to adjust the pH of the slurry to 9.0 to 10.0. Then, 220 parts by weight of the aforesaid aqueous sodium silicate solution at a concentration of 5% by weight as $SiO_2$ (solution A) and 256 parts by weight of an aqueous 2.2% by weight sulfuric acid solution (solution B) were simultaneously added to the pH-adjusted aqueous slurry with stirring at a rate of 1.5 parts/min and maintaining the temperature at 85° to 95° C. During the addition of solution A and solution B, the aqueous slurry was always kept at a pH of 9.0 to 10.0 by the addition of an aqueous sodium hydroxide solution. Thus, a fine silica sol was formed and the fine silica sol having a size of less than 200 m$\mu$ (almost completely 10 to 100 m$\mu$) deposited uniformly on the surfaces of the antimony trioxide particles.

After adjusting the pH of the aqueous slurry to 6.5 to 7.0, the slurry was then allowed to stand at 85° to 95° C for 30 minutes, and then the particles were recovered therefrom by decantation and washed with water until the sulfate was removed from the system. The system was then filtered and the residue was dried at 110° C for 12 hours to provide about 55 parts by weight of an antimony trioxide composition coated with a hydrous zirconium oxide silica coating. The size of the final product in this example was about 0.7 $\mu$, on the average (hereafter all final products had this approximate size, unless otherwise indicated).

EXAMPLE 2

As in Example 1, 31.74 parts by weight of an aqueous zirconyl sulfate ($ZrOSO_4.7H_2O$, $n=4$ to 8) solution at a concentration of 0.3% by weight (as $ZrO_2$) was added to 100 parts by weight of an aqueous slurry of powdered antimony trioxide, and, then, after adjusting the pH of the mixture to about 6.0 by adding thereto 3.5 parts by weight of a 3.0% by weight aqueous sodium hydroxide solution, zirconium coating treatment was carried out. Thereafter, the particles were recovered, washed with water, dried, and crushed as in Example 1 to provide about 104 parts by weight of an antimony trioxide composition coated with hydrous zirconium oxide.

Thereafter, 50 parts of the antimony trioxide composition thus obtained was dispersed under the same conditions and in the same manner as in Example 1 and then 218 parts by weight of an aqueous sodium silicate solution at a concentration of 5% by weight as $SiO_2$ (solution A) and 254 parts by weight of an aqueous 2.2% by weight sulfuric acid solution (solution B) were added under the same conditions and in the same manner as in Example 1 to provide about 68 parts by weight of an antimony trioxide composition coated with a hydrous zirconium oxide silica coating.

EXAMPLE 3

In the manner as in Example 1, 176.6 parts by weight of an aqueous zirconyl sulfate ($ZrOSO_4.7H_2O$, $n=4$ to 8) solution at a concentration of 0.3% by weight (as $ZrO_2$) was added to 100 parts by weight of a uniform aqueous slurry of powdered antimony trioxide having a mean particle size of about 0.7 $\mu$, and, after adjusting the pH of the mixture to about 6.0 by adding thereto 12 parts by weight of a 3.0% by weight aqueous sodium hydroxide solution, the zirconium coating treatment was performed. Thereafter, the coated particles were recovered, washed with water, dried, and crushed as in Example 1 to provide about 100 parts by weight of an antimony trioxide composition coated with hydrous zirconium oxide. Then, 50 parts of the composition was dispersed under the same conditions and in the same manner as in Example 1 and then 106 parts by weight of an aqueous sodium silicate solution at a concentration of 5% by weight as $SiO_2$ (solution A) and 124 parts by weight of an aqueous 2.2% by weight sulfuric acid solution (solution B) were added simultaneously at a rate of 0.7 part/min. to the dispersion under the same conditions and in the manner as in Example 1 to provide about 53 parts by weight of an antimony trioxide composition coated with a hydrous zirconium oxide-silica coating. It should be noted, in this regard, that after completing the silica sol treatment it is necessary to maintain the pH of the resulting slurry in the weakly acidic state, e.g., at a pH of about 6.5. Accordingly, it is most simple to adjust the pH of the slurry to the above value by adding excess $H_2SO_4$, and it is for this reason that the sodium silicate solution amount is lesser than that of the sulfuric acid solution amount. Since the amount of $H_2SO_4$ added can be calculated in advance, this does not cause any operational difficulties.

EXAMPLE 4

As in Example 1, 173.4 parts by weight of an aqueous zirconyl sulfate ($HZrOOHSO_4.2H_2O$) solution at a concentration of 0.3% by weight as $ZrO_2$ was added to 100 parts by weight of a uniform aqueous slurry of powdered of antimony trioxide having a mean particle size of about 0.7 $\mu$, and, after adjusting the pH of the aqueous slurry to about 6.0 by the addition of 12.8 parts by weight of a 3.0% by weight aqueous sodium hydroxide solution, the zirconium coating treatment was carried out as in Example 1. Thereafter, the particles thus treated were recovered, washed with water, dried, and crushed as in Example 1 to provide about 100 parts by weight of antimony trioxide coated with a hydrous zirconium oxide coating.

Then, 50 parts by weight of the composition thus prepared was dispersed in water under the same conditions and in the same manner as in Example 1 and 72.8 parts by weight of an aqueous sodium silicate solution at a concentration of 5% by weight as $SiO_2$ (solution A) and 85 parts by weight of an aqueous 2.2% by weight sulfuric acid solution (solution B) were added at a rate of 0.5 part/min. to the dispersion under the same conditions and in the same manner as in Example 1 to provide about 52 parts by weight of an antimony trioxide composition coated with a hydrous zirconium oxide-silica coating.

EXAMPLE 5

As in Example 1, 170 parts by weight of an aqueous zirconyl sulfate ($HZrOOH.SO_4.2H_2O$) solution at a concentration of 0.3% by weight (as $ZrO_2$) was added to 100 parts by weight of a uniform aqueous slurry of powdered antimony trioxide having a mean particle size of about 0.7 $\mu$, and then the mixture was treated in the same manner as in Example 4 to provide about 100 parts by weight of antimony trioxide coated with a hydrous zirconium oxide coating.

Thereafter, 50 parts by weight of the composition thus obtained was dispersed in water in the same manner and under the same conditions as in Example 1 and then 51 parts by weight of an aqueous sodium silicate solution at a concentration of 5% by weight as $SiO_2$ (solution A) and 59 parts by weight of an aqueous 2.2% by weight sulfuric acid solution (solution B) were simultaneously added at a rate of 0.3 part/min to the dispersion under the same conditions and in the same manner as in Example 1 to provide about 51 parts by weight of antimony trioxide coated with a hydrous zirconium oxide-silica coating.

EXAMPLE 6

As in Example 1, 168.4 parts by weight of an aqueous zirconyl sulfate ($HZrOOHSO_4.2H_2O$) solution at a concentration of 0.3% by weight as $ZrO_2$ was added to 100 parts by weight of a uniform aqueous slurry of powdered antimony trioxide having a mean particle size of about 0.7 $\mu$ and then the mixture was treated in the manner as in Example 4 to provide about 100 parts by weight of antimony trioxide coated with a hydrous zironium oxide coating.

Thereafter, 50 parts of the composition thus obtained was dispersed in water under the same conditions and in the same manner as in Example 1 and then 30.3 parts by weight of a sodium silicate solution at a concentration of 5% by weight as $SiO_2$ (solution A) and 35 parts by weight of an aqueous 2.2% by weight sulfuric acid solution (solution B) were simultaneously added at a rate of 0.2 part/min. to the dispersion under the same conditions and in the same manner as in Example 1 to provide 50.5 parts by weight of antimony trioxide coated with a hydrous zirconium oxide-silica coating.

EXAMPLE 7

By following the same procedure as in Example 5 except for using 34 parts of weight of an aqueous zirconyl sulfate ($ZrOSO_4.7H_2O, n=4$ to 8) solution at a concentration of 0.3% by weight (as $ZrO_2$) in place of the same kind of solution in Example 5, antimony trioxide coated with a hydrous zirconium oxide-silica coating was obtained. cl EXAMPLE 8

By following the same procedure as in Example 5 except for using an aqueous zirconyl chloride ($ZrOCl_2.8H_2O$) solution in place of the zirconyl sulfate solution in Example 5, antimony trioxide coated with a hydrous zirconium oxide-silica coating was obtained.

EXAMPLE 9

By following the same procedure as in the first step of Example 5, antimony trioxide coated with a hydrous zirconium oxide coating was obtained. The composition thus obtained was further uniformly dispersed in water in the same manner as in Example 1 and then 51 parts by weight of an aqueous solution of Snow Tex "O" (trade name of a silica sol, $SiO_2$ 20 to 21 wt%, $Na_2O$ less than 0.02 wt%, pH 3 to 4; made by Nissan Chemical Industries Co., Ltd.) at a concentration of 5% by weight as $SiO_2$ was gradually added to the dispersion at a rate of 0.3 part/min while keeping the pH and the temperature of the system at 9.0 to 10.0 (with an aqueous sodium hydroxide solution) and at 85° to 95° C, respectively. After the addition of the silicate sol was completed, the mixture was further stirred for 30 minutes at 85° to 95° C and at a pH of 9.0 to 10.0, and then the particles were recovered by decantation, washed with water, filtered, and dried as in Example 5 to provide anitmony trioxide coated with a hydrous zirconium oxide-silica coating.

EXAMPLE 10

As in Example 1, 85 parts by weight of an aqueous zirconyl sulfate ($ZrOSO_4.7H_2O$, $n=4$ to 8) solution at a concentration of 0.3% by weight as $ZrO_2$ was added to 100 parts by weight of a uniform aqueous slurry of powdered antimony trioxide having a means particle size of about 0.7 $\mu$ and the mixture obtained treated as in Example 1 to provide about 100 parts by weight of antimony trioxide coated with a hydrous zirconium oxide coating.

Theraftér, 50 parts of the composition thus obtained was dried, crushed into a mean particle size of about 0.8 $\mu$ and redispersed in 500 parts by weight of water followed by stirring uniformly at room temperature for 20 minutes. Then, after adjusting the pH of the slurry to 9.5 to 10.0 by the addition of 40 parts by weight of a 3.0% by weight aqueous sodium hydroxide solution, the aqueous slurry was treated by means of a homogenizer to disperse the antimony trioxide particles as uniformly as possible and then heated to 85° to 95° C while stirring the slurry in a ultrasonic cleaner (made by Branson Instruments Co., U.S.A., resonance frequency: 50 KHz, oscillator: lead titanate zirconate) to prevent the formation of secondary aggregates of the particles by the application of ultrasonic waves. In this case, the pH of the aqueous slurry was kept at 9.0 to 10.0 by the addition of an aqueous sodium hydroxide solution.

Then, an aqueous sodium silicate solution at a concentration of 5% by weight as $SiO_2$ and an aqueous 2.2% by weight sulfuric acid solution were added to the aqueous slurry under the same conditions and in the same manner as in Example 5 at room temperature while applying, in this case, ultrasonic waves of 50 KHz at the above conditions; the reaction was over in 60 minutes. Thus, antimony trioxide coated with a hydrous zirconium oxide-silica coating was obtained.

EXAMPLE 11

After dispersing 100 parts by weight of powdered antimony trioxide having a mean particle size of about 0.7 μ in 1,000 parts by weight of water, the aqueous slurry obtained was stirred uniformly at room temperature. Then, the aqueous slurry was treated by means of a homogenizer to uniformly and sufficiently disperse the particles and, while further stirring the slurry by applying ultrasonic waves of 50 KHz for 60 minutes, 85 parts by weight of an aqueous zirconyl sulfate ($ZrO\cdot SO_4\cdot 7H_2O$, $n=4$ to 8) solution at a concentration of 0.3% by weight (as $ZrO_2$) was added to the aqueous slurry at room temperature. Then, after adjusting the pH of the aqueous slurry to about 6.0 by adding 8.2 parts by weight of a 3.0% by weight aqueous sodium hydroxide solution, the zirconium coating treatment was carried out at room temperature and at atmospheric pressure for 40 minutes. Thereafter, the particles were recovered, washed with water, dried, and crushed in a conventional manner as in Example 10 to provide antimony trioxide coated with a hydrous zirconium oxide-silica coating.

EXAMPLE 12

A zirconium-treated filter cake obtained as in Example 5 was divided into two equal parts and they were allowed to stand at ambient conditions to provide a filter cake having a water content of about 5% by weight (sample A) and a filter cake having a water content of about 30% by weight (sample B).

Furthermore, an aqueous slurry which had been treated with zirconium obtained as in Example 5 was adjusted to have a water content of 90% by weight to provide sample C. By treating these three kinds of samples as in Example 5, hydrous zirconium oxide-silica coated antimony trioxide compositions were obtained.

The hydrous zirconium oxide-silica coated antimony trioxide compositions of this invention prepared by the aforementioned Examples were compared with conventional antimony trioxide powder as in Comparison Example 1 as well as silica-coated antimony trioxide powder prepared by applying the silica-coating treatment as in Example 1 to an antimony trioxide powder as in Example 1 as Comparison Example 2 with respect to chemical resistance and oxygen index, the results being shown in the following Table 1.

Table 1

| Sample No. | Sulfide Resistence | Oxygen Index | Weight % of the Total Weight of Component | |
|---|---|---|---|---|
| | | | $ZrO_2$ | $SiO_2$ |
| Examples | | | | |
| 1 | 9 | 28.1 | 0.9 | 20 |
| 2 | 10 | 27.6 | 7.0 | 16 |
| 3 | 9 | 28.5 | 0.5 | 10 |
| 4 | 8 | 28.9 | 0.5 | 7 |
| 5 | 8 | 29.4 | 0.5 | 5 |
| 6 | 7 | 29.4 | 0.5 | 3 |
| 7 | 7 | 29.4 | 0.2 | 5 |
| 8 | 8 | 29.4 | 0.5 | 5 |
| 9 | 7 | 29.4 | 0.5 | 5 |
| 10 | 8 | 29.4 | 0.5 | 5 |
| 11 | 9 | 29.4 | 0.5 | 5 |
| 12-A | 7 | 29.4 | 0.5 | 5 |
| 12-B | 6 | 29.4 | 0.5 | 5 |
| 12-C | 5 | 28.9 | 0.5 | 5 |
| Comparison Examples | | | | |
| 1 | 1 | 29.4 | — | — |
| 2 | 6 | 27.6 | — | 20 |

From the results shown in the above Table 1, it will be understood that the antimony trioxide compositions of this invention have excellent effects. In particular, it is astonishing that the oxygen index of the hydrous zirconium oxide-silica coated antimony trioxide compositions of this invention are substantially the same as untreated antimony trioxide powder.

In general, when the surface of antimony trioxide is coated, the oxygen index thereof is reduced and thus the effect as a flame retarding assistant becomes lower as compared with uncoated antimony trioxide. In fact, with silica-treated antimony trioxide (as shown in Comparison Example 2 in Table 1), a great reduction in oxygen index is observed. Therefore, the antimony trioxide compositions of this invention are quite superior at this point.

Furthermore, when the thus treated antimony trioxide powder is blended with, for example, a synthetic polyvinyl chloride leather, an unexpected but desirable result is that the transparency of the resulting leather is markedly improved as compared with the case of blending untreated antimony trioxide powder. Thus, the fact that the transparency of the synthetic leather blended with the antimony trioxide of this invention is markedly improved results in giving a clear color tone when the color tone is changed using other pigments, and, thus, the appearance of the synthetic leather becomes excellent and the commercial value of the product is increased.

On the other hand, in plastic articles electrical insulating capability is required in a number of diverse fields such as plastic materials for coating electrical cable, electrically insulating substrates, etc. In general, antimony trioxide is used in high amounts as a flame retardant assistant, but due to its excellent electric insulating capability which antimony trioxide inherently possesses, it is also widely used as an electric insulation material. It was found that the volume resistivity of the antimony trioxide of this invention is markedly improved as compared with an untreated antimony trioxide containing composition, which property is a characteristic feature of measuring electrical insulating capability.

Thus, the inventors succeeded in remarkably improving not only the chemical resistance of antimony trioxide but also the physical properties of plastic materials with which antimony trioxide is conventionally blended, such as transparency, electrical insulating capability, etc., without reducing the oxygen index of antimony trioxide itself.

With respect to volume resistivity and transparency, the results are shown in the following Table 2.

Table 2

| Sample No. | Specific Resistivity ($\times 10^{13}$ cm) | | Transparency (%) |
|---|---|---|---|
| | 2 weight parts addition | 5 weight parts addition | |
| Examples | | | |
| 1 | 1.4 | 2.2 | 35.5 |
| 2 | 1.4 | 2.1 | 48.9 |
| 3 | 1.5 | 2.5 | 36.2 |
| 4 | 1.6 | 2.7 | 32.9 |
| 5 | 1.8 | 3.3 | 32.8 |
| 6 | 1.8 | 3.3 | 32.8 |
| 7 | 1.6 | 3.2 | 32.5 |
| 8 | 1.5 | 3.0 | 32.5 |
| 9 | 1.9 | 3.4 | 32.4 |
| 10 | 1.8 | 3.3 | 32.4 |
| 11 | 1.8 | 3.1 | 32.2 |
| 12-A | 1.7 | 3.2 | 32.5 |
| 12-B | 1.7 | 3.2 | 32.4 |
| 12-C | 1.6 | 3.0 | 32.4 |
| Comparison Example | | | |
| 1 | 1.4 | 2.3 | 18.0 |
| 2 | 1.4 | 2.2 | 28.6 |
| Blank | 1.1 | | 100.0 |

The chemical resistance of the antimony trioxide compositions obtained in the aforesaid Examples and illustrated as Comparison Examples was tested in the following manner:

1. Sulfide resistance: The sample was immersed in a saturated aqueous hydrogen sulfide solution at 25° C for 1 hour and then the extent of discoloring estimated with the naked eye.

2. Combustibility test: The test was carried out by the combustion test process for high molecular weight materials according to the oxygen index system of JIS K 7201 and the oxygen index was calculated by the following formula:

$$\text{Oxygen index} = \frac{O_2}{O_2 + N_2} \times 100$$

wherein $O_2$: flow rate of oxygen (liter/min)
$N_2$: flow rate of nitrogen (liter/min)

The sample pieces tested were prepared in the following manner:

(1) Compounding ratio of vinyl compound:
Polyvinyl chloride (soft): 100 parts by weight (mean m.w. 1050)
Dioctyl phthalate: 50 parts by weight
Barium stearate: 0.5 parts by weight
Calcium stearate: 0.5 parts by weight (2) Preparation of Vinyl sheet:
A mixture of 50 g of the vinyl compound shown above and 1 g. of the sample to be tested was kneaded for 3 minutes at 160° C by means of a hot roll to form a sample sheet.

Estimation: The chemical resistance was estimated by 10 grades, almost no change being 10 and greatly changed being 1.

3. Measurement of electric insulation property: A test sheet 1 mm × 100 mm × 100 mm prepared according to the following procedures was allowed to stand for 30 minutes in an air-conditioned room kept at a temperature of 30° C and at a humidity of less than 60%, and then taken out. After preheating it for 5 minutes, the test sheet was treated at 160° C and at 260 Kg/cm² for 5 hours followed by allowing to it stand. The volume resistivity of the test sheet was then measured by means of a volume resistivity measuring device (produced by Takeda Riken Industry Co., Ltd.).

| Preparation of test sheet | |
|---|---|
| A-1: Blending ratio of resin | |
| PVC (polyvinyl chloride) | 100 parts by weight; mean polymerization degree $\bar{P} = 1050$ |
| DOP (dioctyl phthalate) | 50 parts by weight |
| Stabilizer (a mixture of tribasic lead sulfate and dibasic lead stearate) | 4 parts by weight |
| Filler (CaCO₃) | 20 parts by weight |
| Lubricant (wax) | 1 part by weight |
| A-2: Preparation method of test specimen and conditions | |
| A-1 mixture | 100 parts by weight |
| Each test specimen of antimony trioxide | 2 and 5 parts by weight |

The above materials were mixed for 10 minutes using a heat roll to 160° ±2° C to form a sheet.

4. Measurement of transparency: The transparency of a test sheet the same as was used for measuring the oxygen index (except that the sheet thickness was changed to 0.5 mm) was measured at 20° C using a spectrophotometer (produced by Hitachi, Ltd.) at a wave length of 500 mμ. In this case, the transparency of a blank test sheet in which anitmony trioxide was not present was referred to as "100%".

While the invention has been described in detail and with reference to specific embodiments thereof, it will be apparent to one skilled in the art that various changes and modifications can be made therein without departing from the spirit and scope thereof.

What is claimed is:

1. An antimony trioxide composition of improved chemical and physical properties, including sulfide resistance, transparency and electrical insulation capability, which comprises antimony trioxide particles having on the surfaces thereof hydrous zirconium oxide in an amount of about 0.1 to about 5% by weight (as $ZrO_2$) of the total weight of said composition and fine amorphous silica in an amount of about 1 to about 20% by weight, said silica being coated on said particles as an outer contiguous, dense coating upon electron microscope observation.

2. The antimony trioxide composition of claim 1, wherein said hydrous zirconium oxide has a water content of less than about 30% by weight and is formed from $ZrO_2 \cdot nH_2O$ wherein $n$ satisfies the formula:

$$0.6 \leq n < 5.5.$$

3. The antimony trioxide composition of claim 1, wherein said fine amorphous silica is composed of silica particles having a size of about 10 to about 100mμ in an amount of 5 to 15% by weight, which silica particles are coated in a substantial layer form.

4. A process of producing an antimony trioxide composition of claim 1 of improved chemical and physical properties, including sulfide resistance, transparency and electrical insulation capability, comprising:

(1) adding an aqueous solution of a zirconium salt to an aqueous slurry of antimony trioxide particles so that the proportion of the zirconium salt is about 0.1 to about 5 percent by weight (as $ZrO_2$) of the total weight of said composition to form zirconium hydroxide and deposit it onto the surfaces of the antimony trioxide particles;

(2) separating the antimony trioxde particles having the zirconium hydroxide deposited thereon and subjected the particles to dehydration to provide antimony trioxide particles strongly coated with hydrous zirconium oxide having a water content of less than about 30% by weight and formed from $ZrO_2 \cdot nH_2O$ wherein $n$ satisfies the formula:

$$0.6 \leq n < 5.5;$$

and (3) dispersing the hydrous zirconium oxide-coated antimony trioxide particles obtained in step (2) in water, adding or forming therein a silica sol so that the proportion of the silica sol is from about 1 to about 20% by weight (as $SiO_2$) of the total weight of the composition to thereby deposit amorphous silica onto the surfaces of the hydrous zirconium oxide-coated antimony trioxide particles.

5. The process of claim 4, wherein step (1) is conducted while stirring and mechanically shearing the system.

6. The process of claim 5, wherein step (1) is conducted while applying ultrasonic waves to the system.

7. The process of claim 4, wherein step (1) is conducted over a period of from about 30 minutes to about 6 hours.

8. The process of claim 4, wherein step (1) is conducted over a period of from 45 minutes to 3 hours.

9. The process of claim 4, wherein the concentration of said zirconium salt in said aqueous slurry is at most about 4% by weight.

10. The process of claim 4, wherein the concentration of said zirconium salt is said aqueous slurry is 0.1 to 3% by weight.

11. The process of claim 4, wherein said zirconium salt is one or more of zirconium chloride, zirconium nitrate, zirconium sulfate and basic salts.

12. The process of claim 4, wherein step (2) is conducted at a temperature of from about 60° to about 130° C to effect dehydration.

13. The process of claim 4, wherein step (2) is conducted at a temperature of from 100° to 120° C to effect dehydration.

14. The process of claim 4, wherein step (3) is conducted while stirring and mechanically shearing the system.

15. The process of claim 14, wherein step (3) is conducted while applying ultrasonic waves to the system.

16. The process of claim 4, wherein step (3) is conducted at a temperature of from about 60° to 100° C.

17. The process of claim 4, wherein step (3) is conducted at a temperature of 85° to 95° C.

18. The process of claim 4, wherein step (3) is conducted over a period of from about 1.3 to about 7 hours.

19. The process of claim 4, wherein step (3) is conducted for a period of from 2.3 to 6 hours.

20. The process of claim 4, wherein step (3) is conducted in an aqueous sodium silicate solution and an aqueous solution of a mineral acid to form silica sol.

21. The process of claim 20, wherein the molar ratio of $SiO_2/Na_2O$ in said aqueous sodium silicate solution is about 3.0 to about 3.4.

22. The process of claim 20, wherein the concentration of both aqueous solutions is about 1 to about 7% by weight.

23. The antimony trioxide composition of claim 1 wherein the hydrous zirconium oxide is a coating on the antimony trioxide particles and the silica is a coating over the hydrous zirconium oxide coating, to thereby form a double layer coating.

24. The antimony trioxide composition of claim 1 wherein at least part of the zirconium oxide is dispersed in the silica coating.

* * * * *